(12) United States Patent
Abington et al.

(10) Patent No.: US 10,046,750 B1
(45) Date of Patent: Aug. 14, 2018

(54) SYNCHRONIZING CLUTCH APPLY STATE WITH CONTINUOUS RATIO SHIFT IN A CONTINUOUSLY VARIABLE TRANSMISSION

(71) Applicant: GM GLOBAL TECHNOLOGY OPERATIONS LLC, Detroit, MI (US)

(72) Inventors: James L Abington, Brighton, MI (US); Christopher J Weingartz, Fenton, MI (US)

( * ) Notice: Subject to any disclaimer, the term of this patent is extended or adjusted under 35 U.S.C. 154(b) by 0 days.

(21) Appl. No.: 15/469,796

(22) Filed: Mar. 27, 2017

(51) Int. Cl.
*B60W 10/02* (2006.01)

(52) U.S. Cl.
CPC ..... *B60W 10/02* (2013.01); *B60W 2510/1005* (2013.01); *B60W 2710/02* (2013.01); *B60W 2710/024* (2013.01)

(58) Field of Classification Search
USPC .......................................................... 477/39
See application file for complete search history.

(56) References Cited

U.S. PATENT DOCUMENTS

| | | | | |
|---|---|---|---|---|
| 6,461,271 B2 * | 10/2002 | Nakano | ................. | B60W 10/02 474/18 |
| 7,798,938 B2 * | 9/2010 | Matsubara | ............ | B60W 20/30 477/3 |
| 7,917,275 B2 * | 3/2011 | Doering | .............. | F02D 41/0002 701/51 |
| 9,694,804 B2 * | 7/2017 | Nefcy | ................... | B60W 10/30 |
| 2015/0329105 A1 * | 11/2015 | Matsui | ..................... | B60K 6/48 701/22 |

OTHER PUBLICATIONS

US Application Filing Date: Feb. 8, 2017; U.S. Appl. No. 15/427,296; Applicant: GM Global Technology Operations LLC; Title: Lash Mitigation.

* cited by examiner

*Primary Examiner* — Dirk Wright

(57) ABSTRACT

A continuously variable transmission, a control system, and a method is provided for synchronizing a clutch application state change and a continuous upshift in a motor vehicle propulsion system having a continuously variable transmission (CVT). The control system and method are configured to determine whether a continuous upshift of the CVT is impending. The continuous upshift is defined as a pulley ratio change exceeding a predetermined threshold for a predetermined pulley ratio change period. If a continuous upshift is impending, the control system and method are configured to alter a clutch engagement state after a predetermined delay period to synchronize the change in clutch engagement state with an engine speed change.

20 Claims, 3 Drawing Sheets

SYNCHRONIZING CLUTCH APPLY STATE WITH CONTINUOUS RATIO SHIFT IN A CONTINUOUSLY VARIABLE TRANSMISSION

TECHNICAL FIELD

The present disclosure pertains to a propulsion system having continuously variable transmission (CVT), a control system, and a method for controlling a clutch.

INTRODUCTION

A continuously variable transmission (CVT) is a type of power transmission that is capable of continuously changing an output/input speed ratio over a range between a minimum (underdrive) ratio and a maximum (overdrive) ratio, thus permitting an infinitely variable selection of engine operation that can achieve a preferred balance of fuel consumption and engine performance in response to an output torque request. Unlike conventionally-geared transmissions that use one or more planetary gear sets and multiple rotating and braking friction clutches to establish a discrete gear state, a CVT uses a variable-diameter pulley system to achieve the infinitely variable selection of gear ratios.

The pulley system, which is commonly referred to as a variator assembly, can transition anywhere within a calibrated range of speed ratios. A typical belt-type or chain-type variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and an input gear set, and thus acts as a driving/primary pulley. The other pulley is connected via additional gear sets to an output shaft of the CVT and thus acts as a driven/secondary pulley.

In order to vary a CVT speed ratio and to transfer torque to the drivetrain, a clamping force (applied through hydraulic pressure) may be applied to one or both of the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This, in turn, changes the effective diameters of the variator pulleys and may vary the speed ratio of the CVT.

The continuous shift pattern of a CVT sounds unusual to some drivers who are accustomed to hearing shifting patterns of typical stepped gear transmission. In addition, noise, vibration, and harshness of propulsion systems in general have been improved in recent years. To this end, it is desirable to mask propulsion system sounds caused by CVT shifting, clutch engagement, changes in engine speed, and changes in torque converter turbine speed.

SUMMARY

The present disclosure provides a method and control system configured to synchronize application state (e.g., engagement or disengagement) of a clutch, such as a torque converter lockup clutch, with a change in pulley ratio of the CVT, which may also correspond with a change in engine speed and torque converter turbine speed. Such synchronization may result in a single engine note change and unperceivable clutch engagement. For example, in some forms, the method and control system are configured to apply the torque converter lockup clutch in combination with an initial pulley ratio upshift from launch, resulting in masking an engine speed drop during a torque converter slip profile and blending the engine speed drop with the turbine acceleration change due to the pulley ratio change.

In one form, which may be combined with or separate from the other forms disclosed herein, the disclosure provides a method for synchronizing a clutch application state and a continuous upshift in a motor vehicle propulsion system having a continuously variable transmission (CVT). The method includes determining whether a continuous upshift of the CVT is beginning to occur or impending, where the continuous upshift is defined as a pulley ratio change exceeding a predetermined threshold for a predetermined ratio change period. If a continuous upshift is beginning to occur or impending, the method includes altering a clutch engagement state after a predetermined delay period to synchronize the clutch engagement state with an engine speed change.

In another form, which may be combined with or separate from the other forms disclosed herein, the disclosure provides a control system for a propulsion system of a motor vehicle having a CVT and a torque converter having a torque converter lockup clutch. The control system includes a continuous shift determination module configured to determine whether a continuous upshift of the CVT is beginning to occur or impending, where the continuous upshift is defined as a pulley ratio change exceeding a predetermined threshold for a predetermined ratio change period. A lockup clutch engagement module is configured to alter a clutch engagement state after a predetermined delay period after determination that a continuous upshift is beginning to occur or impending by the continuous shift determination module, to synchronize the clutch engagement state with an engine speed change.

In yet another form, which may be combined with or separate from the other forms disclosed herein, a propulsion system of a motor vehicle is provided. The propulsion system includes an engine operable to power the motor vehicle. The engine has an engine output shaft configured to transfer torque. A torque converter coupling is connected to the engine output shaft. The torque converter coupling includes a torque converter and a torque converter lockup clutch. The torque converter has an impeller and a turbine, and the impeller is connected to the engine output shaft. The impeller is configured to form a fluid coupling with the turbine. The torque converter lockup clutch is configured to selectively lock together the impeller and the turbine. A continuously variable transmission (CVT) is configured to selectively change a pulley ratio between the turbine and a transmission output shaft. The propulsion system further includes a control system having a continuous shift determination module configured to determine whether a continuous upshift of the CVT is beginning to occur or impending, where the continuous upshift is defined as a pulley ratio change exceeding a predetermined threshold for a predetermined ratio change period. A lockup clutch engagement module is configured to alter a clutch engagement state of the torque converter lockup clutch after a predetermined delay period after determination that a continuous upshift is beginning to occur or impending by the continuous shift determination module, to synchronize the clutch engagement state with an engine speed change.

Additional features may optionally be provided, including but not limited to the following: the method and control system being configured to determine a torque converter turbine speed of the turbine of the torque converter; the method and control system being configured to determine an engine acceleration; the method and control system being configured to estimate a shift time for the continuous upshift of the CVT based on the torque converter turbine speed and the engine acceleration; the method and control system being configured to alter the clutch engagement state at about the shift time of the continuous upshift; the clutch being a torque converter lockup clutch of the torque converter; wherein altering the clutch engagement state includes engaging or disengaging the torque converter lockup clutch; the shift time being a start time of the upshift; wherein altering the clutch engagement state includes engaging the torque converter lockup clutch; the method and control system being configured to determine a vehicle speed and a vehicle acceleration; the method and control system being configured to determine a pulley ratio map based on the vehicle speed and the vehicle acceleration; the method and control system being configured to determine whether the continuous upshift is beginning to occur or impending based at least in part on the pulley ratio map; the method and control system being configured to determine a current turbine acceleration; the method and control system being configured to determine a projected turbine acceleration based on a projected ratio of the pulley ratio map and the current turbine acceleration; the method and control system being configured to capture an initial torque converter slip; the method and control system being configured to start a timer if it is determined that a continuous upshift is beginning to occur or impending; and the method and control system being configured to determine a torque converter lockup clutch slip profile based on the projected turbine acceleration to equate an engine speed with the turbine speed.

Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
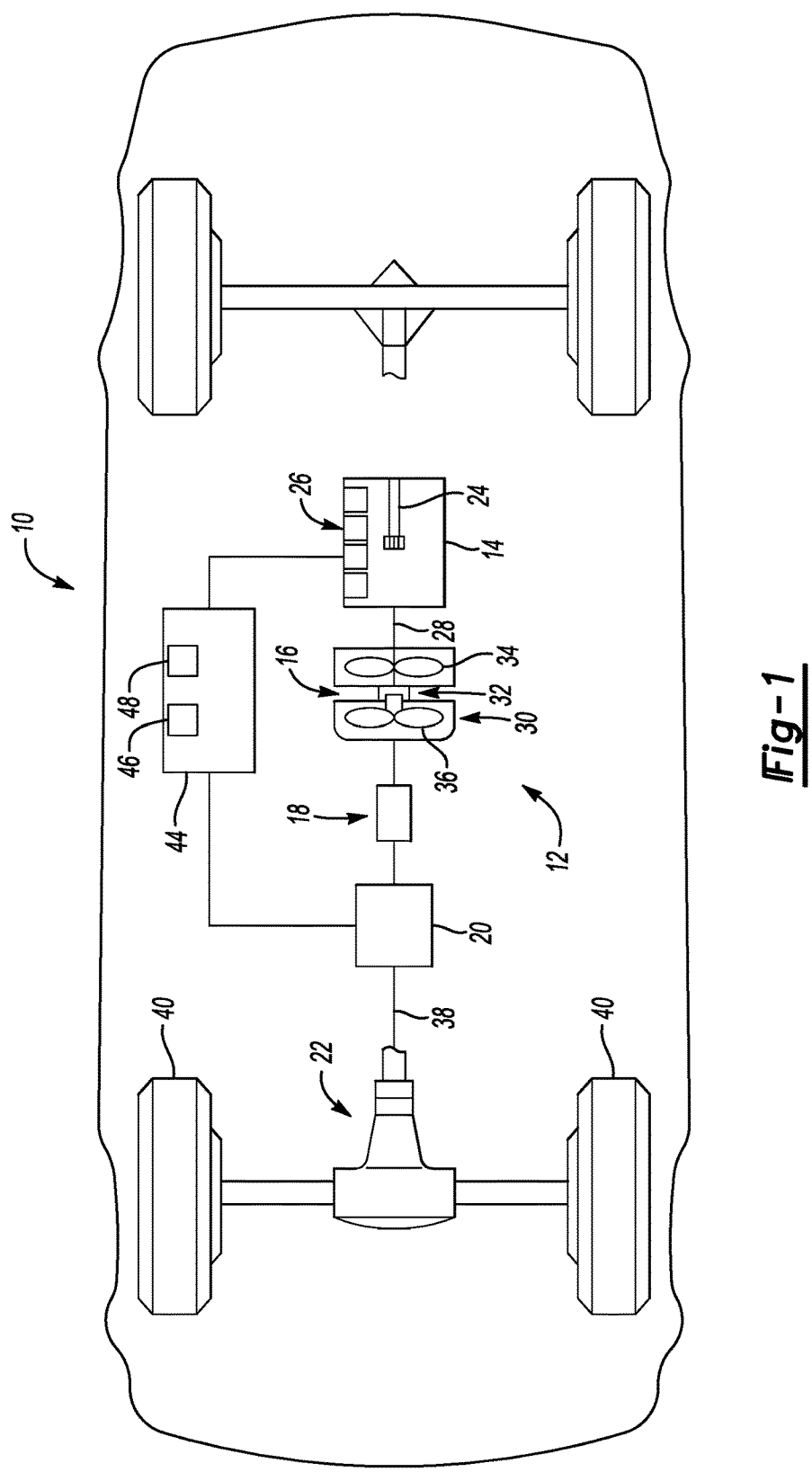
FIG. 1 is a schematic plan view of a motor vehicle including a propulsion system, in accordance with the principles of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the disclosure in any manner.

Referring now to the drawings, wherein like reference numbers correspond to like or similar components throughout the several figures, FIG. 1 schematically illustrates a motor vehicle generally designated at 10. The motor vehicle 10 may be any type of vehicle, such as a car, truck, van, sport-utility vehicle, etc.

The motor vehicle 10 includes a propulsion system 12 configured to power the motor vehicle 10. The propulsion system 12 may include an engine 14, a torque converter coupling 16, a forward drive clutch or switching mechanism 18, a continuously variable transmission (CVT) 20, and a final drive assembly 22. The engine 14 could be an internal combustion engine, an electric engine, or a hybrid, by way of example. The engine 14 is operable to power the motor vehicle 10 and includes a crankshaft 24 configured to rotate to move a plurality of pistons (not shown) within a plurality of piston cylinders 26. The crankshaft 24 is configured to move each of the pistons within its own respective cylinder 26.

Although the engine 14 is depicted as including four cylinders 26, the engine 14 may include any desired number of cylinders 26, such as two, three, four, six, or eight, by way of example. Each cylinder 26 is configured to undergo a combustion event to power the motor vehicle 10. The engine 14 has an engine output shaft 28 configured to transfer torque to the torque converter coupling 16.

The torque converter coupling 16 is connected to the engine output shaft 28 and includes a torque converter 30 and a torque converter lockup clutch 32. The torque converter 30 has an impeller (or pump) 34 and a turbine 36, which are typically separated by a stator (not shown). The impeller 34 is fixed to the engine output shaft 28. The impeller 34 is configured to form a fluid coupling with the turbine 36 under certain conditions, as is known in the art. The torque converter lockup clutch 32 is configured to selectively increase the torque-transmitting capacity between the impeller 34 and the turbine 36 to transmit torque and rotation between the impeller 34 and the turbine 36.

The turbine 36 is connected to the forward drive coupling/switching device 18, which may include a friction clutch, a binary clutch, or a Sprague type device, by way of example. The forward drive coupling/switching device 18 couples the engine 14 and CVT 20 in a forward direction. The CVT 20 is configured to selectively change a gear ratio between the engine output shaft 28 and a transmission output shaft 38. The forward drive coupling/switching device 18 is configured to selectively connect the turbine 36 to the CVT 20. The CVT 20 is interconnected with the final drive unit 22 to propel a set of wheels 40 of the motor vehicle 10. Although referred to generally as a CVT 20, the CVT 20 may be a continuously variable transmission, or an infinitely variable transmission, by way of example.

A control system 44 may be used to control the engine 14 and/or the CVT 20. In some variations, the control system 44 includes an engine control module 46 and a transmission control module 48, by way of example. The engine 14 and the CVT 20 may be equipped with a plurality of actuators and sensing devices for monitoring operation, and in the case of the engine 14, for delivering fuel to form a combustion charge to produce torque that is responsive to an operator torque request. The sensors associated with the engine 14 or CVT 20 may be configured to provide feedback to the control system 44.

Figure 2:
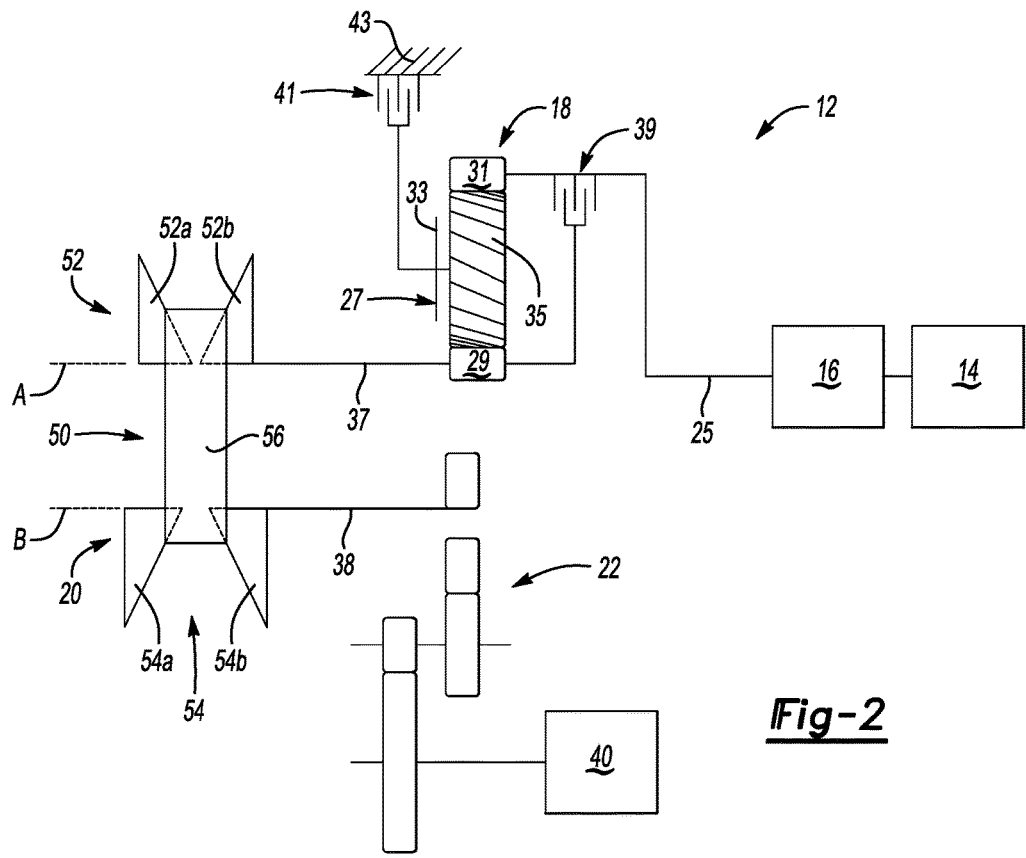
FIG. 2 is a schematic diagrammatic illustration of the motor vehicle propulsion system of FIG. 1 that shows an automotive engine rotatably coupled to a continuously variable transmission (CVT), in accordance with the principles of the present disclosure.

Referring now to FIG. 2, additional details of the propulsion system 12 including the CVT 20 are illustrated. The engine 14, torque converter coupling 16, final drive assembly 22, and wheels 40 are schematically illustrated, and any description above with respect to these elements shown in FIG. 1 applies equally here. A gearbox (not shown) may also be included upline or downline of the CVT 20 for additional gearing options.

The output member 25 of the torque converter coupling 16 rotatably couples to the forward-reverse switching mechanism 18 and serves as an input to the CVT 20. The forward-reverse switching mechanism 18 is provided because the engine 12 is operated in a predetermined single direction. The forward-reverse switching mechanism 18 may be provided in a number of different configurations, without falling beyond the spirit and scope of the present disclosure. In the specific example of FIG. 2, the forward-reverse switching mechanism 18 includes a simple planetary gear set 27 including a sun gear 29, a ring gear 31 disposed coaxially about the sun gear 29, and a carrier 33 bearing a plurality of pinion gears 35 that mesh with both the sun gear 29 and the ring gear 31. In other variations, a double-pinion planetary gear set could be used, having one set of pinion gears meshing with a second set of pinion gears, the first set of pinion gears meshing with the sun gear 29 and the second set of pinion gears meshing with the ring gear 31, or simply a type of forward drive clutch could be used. The output member 25 of the torque converter coupling 16 is continuously connected to the ring gear 31, and an input member 37 to the CVT 20 is continuously connected to the sun gear member 29, in this example.

The forward-reverse switching mechanism 18 further includes a forward clutch 39 and a reverse brake 41. The forward clutch 39 is selectively engageable to connect the sun gear 29 and CVT input member 37 to the ring gear 31 and the torque converter output member 25 so that these elements rotate together as a single unit. Accordingly, the engine 14 is then operable to drive the CVT 20 in a forward direction. The reverse brake 41 is selectively engageable to connect the carrier member 33 with a stationary member, such as the transmission housing 43, so that the direction of the input rotation would then be reversed, as applied to the CVT input member 37. It should be understood, however, that the torque converter output member 25 and CVT input member 37, as well as the reverse brake 41 and the forward clutch 39, could be interconnected in a different manner and still achieve forward-reverse switching, without falling beyond the spirit and scope of the present disclosure. For example, other power flows to alternate between forward and reverse could be used, such as alternative configurations using two or three clutches and/or one, two, or more gear sets. The forward clutch 39 and reverse brake 41 may each be controlled by an actuator, such as a hydraulically-controlled actuator, that supplies fluid pressure to the clutch 39 or brake 41.

In this example, the CVT 20 is a belt-type or chain-type CVT that may be advantageously controlled by the control system 44. The CVT 20 includes a variator assembly 50 that transfers torque between the CVT input member 37 and the CVT output member 38. The variator assembly 50 includes a first, or primary pulley 52, a second, or secondary pulley 54, and a continuous rotatable device 56, such as a belt or chain, or any flexible continuous rotating device, that rotatably couples the first and second pulleys 52, 54 to transfer torque therebetween. The first pulley 52 and input member 37 rotate about a first axis A, and the second pulley 54 and output member 38 rotate about a second axis B. One of the first and second pulleys 52, 54 may act as a ratioing pulley to establish a speed ratio and the other of the first and second pulleys 52, 54 may act as a clamping pulley to generate sufficient clamping force to transfer torque. As used herein, the term 'speed ratio' refers to a variator speed ratio, which may be a ratio of a CVT output speed and a CVT input speed, which may also be referred to as the transmission gear ratio. Thus, the distance between the first pulley halves 52a, 52b may be varied (by moving one or more of the pulley halves 52a, 52b along the axis A) to move the continuous member 56 higher or lower within the groove defined between the two pulley halves 52a, 52b. Likewise, the second pulley halves 54a, 54b may be moved with respect to each other along the axis B to change the ratio or torque-carrying capacity of the CVT 20. One or both pulley halves 52a, 52b, 54a, 54b of each pulley 52, 54 may be moved with an actuator, such as a hydraulically-controlled actuator that varies the fluid pressure supplied to the pulleys 52, 54.

The motor vehicle propulsion system 12 preferably includes one or more sensors or sensing devices, such as Hall-effect sensors, for monitoring rotational speeds of various devices (not shown), including, e.g., an engine speed sensor, a torque converter turbine speed sensor, a CVT variator input speed sensor, a CVT variator output speed sensor, and one or more wheel speed sensors. Each of the sensors communicates with the control system 44.

Figure 3:
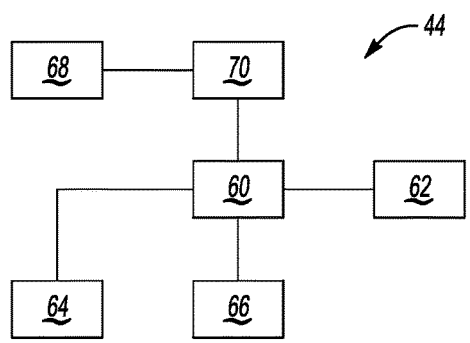
FIG. 3 is a schematic illustration of a control system of the motor vehicle propulsion system shown in FIGS. 1-2, according to the principles of the present disclosure.
Figure 4:
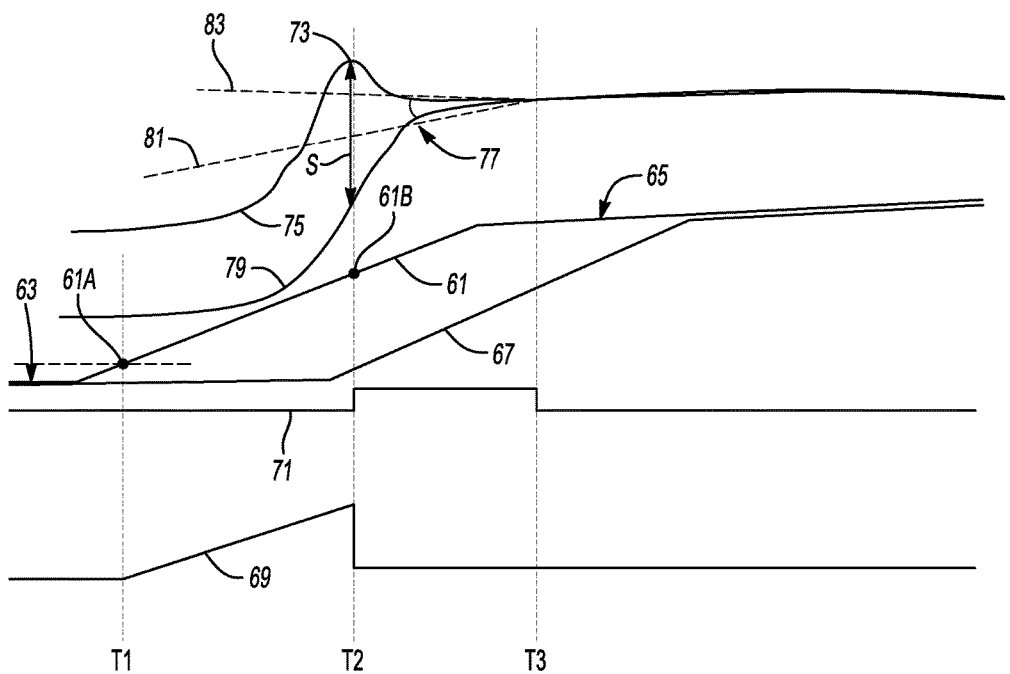
FIG. 4 is a graph illustrating corresponding signals of the control system of FIG. 3, including pulley ratio map, turbine speed, engine speed, and clutch application, in accordance with the principles of the present disclosure.

Referring now to FIGS. 3 and 4, elements and details of the control system 44 are illustrated in further detail. The controller 44 preferably includes at least one processor and at least one memory device (or any non-transitory, tangible computer readable storage medium) on which are recorded instructions for executing instruction sets for controlling the CVT 20 and/or the engine 12.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Referring to FIG. 3, the control system 44 includes a continuous shift determination module 60 configured to determine whether a continuous upshift of the CVT 20 is beginning to occur or is impending (even if the upshift has not begun to occur). The CVT 20 may have a continuous, smooth shift pattern as the continuous member 56 moves within the pulleys 52, 54, and in harsher shifts, the shift pattern may appear like a stepped shift in a traditional transmission to accomplish upshifts in a faster manner. For example, referring to FIG. 4, a continuous upshift of the CVT 20 is represented as part of a projected ratio profile line 61, which shows that the CVT 20 smoothly shifts from a lower gear state (or pulley ratio) in an initial section 63 to a higher gear state (or pulley ratio) in a later section 65. Thus a "continuous upshift" is defined as a pulley ratio change exceeding a predetermined threshold for a predetermined ratio change period, which may be from a lower pulley ratio to a higher pulley ratio. In other words, the pulley ratio change occurs for a long enough time period so as not to be considered a transient noise or other false signal.

In reference to FIG. 3, a lockup clutch engagement module 62 is configured to alter a clutch engagement state after a predetermined delay period after determination that a continuous upshift is beginning to occur or impending (will occur in the near future) by the continuous shift determination module 60, to synchronize the clutch engagement state with an engine speed change. More particularly, with reference to the graph in FIGS. 3 and 4, after the continuous shift determination module 60 determines that a continuous upshift is beginning to occur, impending, or will occur in the near future, an initial projected ratio is recorded at an initial time T1. For example, the projected ratio has started to increase, and the system is able to determine that a continuous upshift is impending, or about to occur in the near future. The initial projected ratio is collected at point 61A on the projected ratio shift line 61. A pulley ratio commanded profile is indicated at line 67. Based on the known pulley projected ratio profile 61, it is known that at time T2, the pulley ratio projected 61 will be continuing to effect an upshift, and at time T3, the upshift will be completed.

Once the continuous shift determination module 60 determines that an upshift will occur, or is impending, at time T1, a timer is a started, as shown at timer line 69. After a predetermined (calibrated) amount of time elapses, between T1 and T2 in this example, the lockup clutch engagement module 62 alters the clutch engagement state, which in this example, includes applying the torque converter lockup clutch 32, at time T2, as illustrated with clutch engagement profile line 71. In other words, the lockup clutch engagement module 62 is configured to engage the torque converter lockup clutch 32 after the predetermined delay period (T2−T1). The clutch engagement line 71 shows the lockup clutch 32 engaged between times T2 and T3 and disengaged elsewhere.

The engagement of the torque converter lockup clutch 32 at time T2 is timed so that the engagement corresponds to a change in an engine speed profile 75, which may be a drop in engine speed (rpm), such as at point 73. At point 73, a slip S exists between the turbine 36 and the engine 14. In this example, the engine speed high point 73 is shown in an exaggerated position; in other examples, the engine speed 75 may plateau at point 73, rather than dropping thereafter. At time T2, the turbine 36 and the impeller 34 are not locked together, and thus, the turbine 36 is not locked together with the engine 14. When the torque converter lockup clutch 32 is applied at time T2, the engine 14 and turbine 36 begin to be brought together, and at T3, the engine 14 and turbine 36 are fully in sync with each other, or "locked together." Thus, a knee 77 in the turbine speed profile 79 is brought near the engine speed profile 75 at a point where the ratio profile 61 completes an upshift and the torque converter clutch 32 is being applied.

In some variations, the control system 44 includes a torque converter monitoring module 64 configured to determine the torque converter turbine speed of the turbine 36 of the torque converter 30, as illustrated by the torque converter speed profile 79 shown in FIG. 4. An engine monitoring module 66 may be configured to determine an engine acceleration, which may be determined two points along the engine speed profile 75, by way of example. Each of the torque converter turbine speed and the engine acceleration may be input to the continuous shift determination module 60 to be used by the continuous shift determination module 60 to estimate a shift time for the continuous upshift of the CVT 20 based on the torque converter turbine speed 79 and the engine acceleration (e.g., based on engine speed 75), as described above. That way, the lockup clutch engagement module 64 is configured to alter the clutch engagement state (in this case, apply the torque converter lockup clutch 32) at about the shift time of the continuous upshift. Applying the lockup clutch 32 during the engine speed drop after point 73 causes the change in sound from the engine speed drop (or plateau) to be masked during the slip profile S between the engine 14 and turbine 36 (represented by a differential between engine speed 75 and turbine speed 79). The engine speed 75 drop is blended with the turbine acceleration due to the pulley ratio upshift creating a single engine note change and unperceivable torque converter clutch 32 engagement.

In order to determine a known pulley ratio map profile 61, to predict when the engine speed 75 and turbine speed 79 will come together during an upshift, the control system 44 may be configured to determine a vehicle speed and a vehicle acceleration. A ratio map module 70 may be configured to determine a pulley ratio map, such as the projected pulley ratio map 61, based on the vehicle speed and the vehicle acceleration. The continuous shift determination module 60 may be configured to continuous upshift is impending based at least in part on the pulley ratio map 61.

The torque converter monitoring module 64 may be configured to determine a current turbine acceleration (e.g., using two points along the current turbine speed profile 79). The torque converter monitoring module 64 may be configured to determine a projected turbine acceleration based on a projected ratio of the projected pulley ratio map 61 and the current turbine acceleration. For example, a current and projected pulley ratio may be determined from the projected ratio profile 61. A projected turbine acceleration may be determined from the following relationship:

$$dn_f = \frac{dn_i * r_f}{r_i} \quad (1)$$

where $dn_f$ is a future or projected turbine acceleration, $dn_i$ is a current or initial turbine acceleration, $r_f$ is a future or projected pulley ratio, and $r_i$ is a current or initial pulley ratio. For example, an initial projected pulley ratio may be captured at point 61A at time T1 and a projected pulley ratio may also be captured at point 61B at time T2, and the change in pulley ratio may be used to predict a turbine acceleration rate do at the time of sync (e.g., T3).

The projected turbine speed profile may be plotted as shown at dotted line 81. A desired engine speed profile 83 may be plotted as shown at dotted line 83. The projected turbine and engine speed profiles 81, 83 converge at the about intersection of the actual engine speed and turbine speed profiles 75, 79, which is at time T3.

In some variations, the torque converter monitoring module 64 may be configured to capture an initial torque converter slip S when the torque converter lockup clutch 32 is initially applied at time T2, which may be used to estimate the timing until the convergence of the engine speed 75 and turbine speed 79 (at time T3 in this example). The torque converter monitoring module 64 may be configured to determine the torque converter lockup clutch slip profile S based on the projected turbine acceleration $dn_f$ to equate an engine speed 75 with the turbine speed 79. Accordingly, a calibrated engine approach speed 75 is used to affect the timing of the sync of the engine 14 and turbine 36 to correspond to the upshift in the pulley ratio map 61. As explained above, the continuous shift determination module 60 may be configured to start a timer 69 if it is determined that a continuous upshift is impending or starting to occur.

More particularly, the torque converter monitoring module 64 may be configured to capturing the initial torque converter slip S and determine a torque converter lockup clutch slip profile based on the projected turbine acceleration and the initial torque converter slip S. The control system 44 may be configured to determine the timing of the equation of an engine speed 75 with the turbine speed 79 based on the torque converter lockup clutch slip profile.

The control system 44 of FIG. 3 may be programmed to execute the steps of a method 100, as defined in FIG. 5 and as discussed in greater detail below. Further, each of the modules 60, 62, 64, 66, 68, 70 of the control system 44 may be contained within the ECM, the TCM, or another controller or control system, by way of example.

Figure 5:
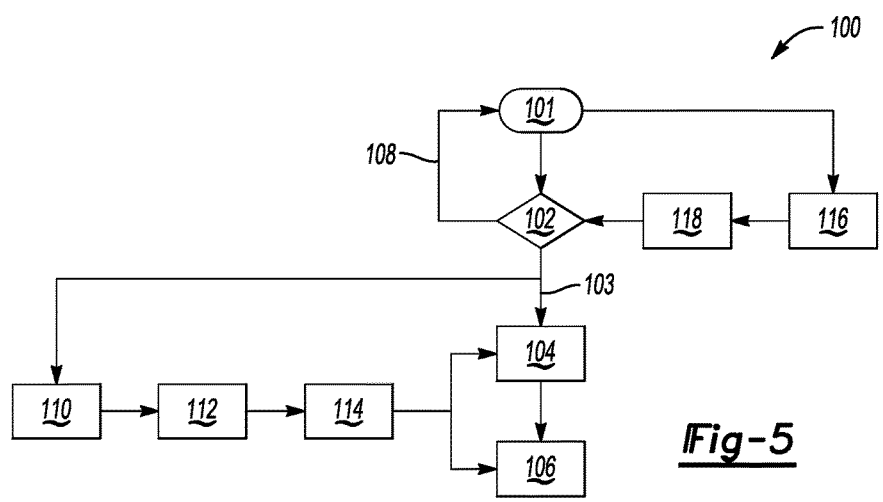
FIG. 5 is a block diagram illustrating a method for synchronizing a clutch application state and a continuous upshift in the motor vehicle propulsion system shown in FIGS. 1-2, according to the principles of the present disclosure.

Referring now to FIG. 5, a flowchart of one variation of a method 100 stored on an instruction set and executable by one or more controllers 46, 48 of the control system 44 is shown. For example, the method 100 is a method for synchronizing a clutch application state and a continuous upshift in a motor vehicle propulsion system 12 having a continuously variable transmission (CVT) 20.

The method 100 may begin with a start module 101 and proceed to a step or block 102, where the method 100 (and/or control system 44) includes determining whether a continuous upshift of the CVT 20 is impending, where the continuous upshift is defined as a pulley ratio change exceeding a predetermined threshold for a predetermined ratio change period, which may be from a lower pulley ratio to a higher pulley ratio. If the method 100 determines in step 102 that a continuous upshift is impending, the method 100 may then proceed along a path 103 to a step 104 of starting a timer. After a predetermined delay period has elapsed as determined by the timer, the method 100 proceeds to a step 106 of altering a clutch engagement state to synchronize the change in the clutch engagement state with an engine speed change.

If in step 102, the method 100 does not determine that a continuous upshift of the CVT 20 is impending, the method 100 proceeds along a path 108 back to the start module 101 and the step 102 is repeated.

In some variations, the method 100 may include a step 110 of determining a torque converter turbine speed of the turbine 36 of the torque converter 30 and a step 112 of determining an engine acceleration. The method 100 may further include a step 114 of estimating a shift time for the continuous upshift of the CVT 20 based on the torque converter turbine speed and the engine acceleration. The start time is used by the step 104 and/or 106 to alter the clutch engagement state, so that the method 100 includes altering the clutch engagement state at about the shift time of the continuous upshift.

The step 106 of altering the clutch engagement state may include engaging the torque converter lockup clutch 32 or another clutch, such as the forward drive clutch 39. The shift time may be the start time of the upshift, or another time during the upshift.

In another optional step 116, the method 100 may include determining a vehicle speed and/or a vehicle acceleration. The method 100 may also include a step 118 of determining a pulley ratio map 61 based on the vehicle speed and the vehicle acceleration. The step 102 may be configured to determining whether the continuous upshift is impending based at least in part on the pulley ratio map 61.

The method 100 may include further optional steps of determining a current turbine acceleration and determining a projected turbine acceleration based on a projected ratio of the pulley ratio map 61 and the current turbine acceleration, for example, with the relationship shown in equation (1). The method 100 may also include a step of capturing an initial torque converter slip S and determining a torque converter lockup clutch slip profile based on the projected turbine acceleration and the initial torque converter slip. The method 100 may further include determining the timing of an equation of an engine speed with the turbine speed based on the torque converter lockup clutch slip profile.

The control system 44 may be configured to execute each of the steps illustrated in FIG. 5. Thus, the entire description of FIG. 5 and the graph in FIG. 4 may be applied by the control system 44 to effectuate the method 100. Furthermore, the control system 44 may include one or more controllers that include a number of control logics that are configured to execute the steps of the methods 100 explained above.

In the example provided, the clutch that is engaged or disengaged by the control system 44 and method 100 is the torque converter lockup clutch 32. However, it should be understood that another clutch could be used, such as the forward drive clutch 39.

The controller(s) of the control system 44 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some examples for carrying out the claimed disclosure have been described in detail, various alternative designs and examples exist for practicing the disclosure defined in the appended claims. Furthermore, the examples shown in the drawings or the characteristics of various examples mentioned in the present description are not necessarily to be understood as examples independent of each other. Rather, it is possible that each of the characteristics described in one of the examples of an example can be combined with one or a plurality of other desired characteristics from other examples, resulting in other examples not described in words or by reference to the drawings. Accordingly, such other examples fall within the framework of the scope of the appended claims.

What is claimed is:

1. A method for synchronizing a clutch application state and a continuous upshift in a motor vehicle propulsion system having a continuously variable transmission (CVT), the method comprising:
   determining whether a continuous upshift of the CVT is impending, the continuous upshift being defined as a pulley ratio change exceeding a predetermined threshold for a predetermined pulley ratio change period; and
   if a continuous upshift is impending, altering a clutch engagement state after a predetermined delay period to synchronize a change in the clutch engagement state with an engine speed change.

2. The method of claim 1, further comprising:
   determining a torque converter turbine speed of a turbine of a torque converter;
   determining an engine acceleration;
   estimating a shift time for the continuous upshift of the CVT based on the torque converter turbine speed and the engine acceleration; and
   altering the clutch engagement state at about the shift time of the continuous upshift.

3. The method of claim 2, further comprising providing the clutch as a torque converter lockup clutch of the torque converter, wherein altering the clutch engagement state includes one of engaging and disengaging the torque converter lockup clutch.

4. The method of claim 3, wherein the step of altering the clutch engagement state includes engaging the torque converter lockup clutch.

5. The method of claim 4, further comprising:
   determining a vehicle speed and a vehicle acceleration;
   determining a pulley ratio map based on the vehicle speed and the vehicle acceleration; and
   determining whether the continuous upshift is impending based at least in part on the pulley ratio map.

6. The method of claim 5, further comprising:
   determining a current turbine acceleration;
   determining a current pulley ratio; and
   determining a projected turbine acceleration based on a projected ratio of the pulley ratio map, a current pulley ratio, and the current turbine acceleration.

7. The method of claim 6, further comprising starting a timer if it is determined that a continuous upshift is impending.

8. The method of claim 7, further comprising:
   capturing an initial torque converter slip;
   determining a torque converter lockup clutch slip profile based on the projected turbine acceleration and the initial torque converter slip; and
   determining timing of an equation of an engine speed with the turbine speed based on the torque converter lockup clutch slip profile.

9. A control system for a propulsion system of a motor vehicle having a continuously variable transmission (CVT) and a torque converter having a torque converter lockup clutch, the control system comprising:
   a continuous shift determination module configured to determine whether a continuous upshift of the CVT is impending, the continuous upshift being defined as a pulley ratio change exceeding a predetermined threshold; and
   a lockup clutch engagement module configured to alter a clutch engagement state after a predetermined delay period after determination that a continuous upshift is impending by the continuous shift determination module, to synchronize the clutch engagement state with an engine speed change.

10. The control system of claim 9, further comprising:
    a torque converter monitoring module configured to determine a torque converter turbine speed of a turbine of the torque converter;
    an engine monitoring module configured to determine an engine acceleration, the continuous shift determination module being configured to estimate a shift time for the continuous upshift of the CVT based on the torque converter turbine speed and the engine acceleration, the lockup clutch engagement module being configured to alter the clutch engagement state at about the shift time of the continuous upshift.

11. The control system of claim 10, the lockup clutch engagement module being configured to alter the clutch engagement state by one of engaging and disengaging the torque converter lockup clutch.

12. The control system of claim 11, wherein the shift time is a start time of the continuous upshift, the lockup clutch engagement module being configured to engage the torque converter lockup clutch after the predetermined delay period.

13. The control system of claim 12, further comprising:
a vehicle dynamics module configured to determine a vehicle speed and a vehicle acceleration; and
a ratio map module configured to determine a pulley ratio map based on the vehicle speed and the vehicle acceleration, the continuous shift determination module being configured to determine that the continuous upshift is impending based at least in part on the pulley ratio map.

14. The control system of claim 13, the torque converter monitoring module being configured to determine a current turbine acceleration and determine a projected turbine acceleration based on a current pulley ratio, a projected ratio of the pulley ratio map, and the current turbine acceleration, the continuous shift determination module being configured to start a timer if it is determined that a continuous upshift is impending, the torque converter monitoring module being configured to capture an initial torque converter slip, the torque converter monitoring module being configured to determine a torque converter lockup clutch slip profile based on the projected turbine acceleration and the initial torque converter slip, the control system being configured to determine timing of an equation of an engine speed with the turbine speed based on the torque converter lockup clutch slip profile.

15. A propulsion system of a motor vehicle, the propulsion system comprising:
an engine operable to power the motor vehicle, the engine having an engine output shaft configured to transfer torque;
a torque converter coupling connected to the engine output shaft, the torque converter coupling having a torque converter and a torque converter lockup clutch, the torque converter having an impeller and a turbine, the impeller being connected to the engine output shaft, the impeller being configured to form a fluid coupling with the turbine, the torque converter lockup clutch being configured to selectively lock together the impeller and the turbine;
a continuously variable transmission (CVT) configured to selectively change a pulley ratio between the turbine and a transmission output shaft; and
a control system comprising:
a continuous shift determination module configured to determine whether a continuous upshift of the CVT is impending, the continuous upshift being defined as a pulley ratio change exceeding a predetermined threshold; and
a lockup clutch engagement module configured to alter a clutch engagement state of the torque converter lockup clutch after a predetermined delay period after determination by the continuous shift determination module that a continuous upshift is impending, to synchronize the clutch engagement state with an engine speed change.

16. The propulsion system of claim 15, wherein the control system further comprises:
a torque converter monitoring module configured to determine a torque converter turbine speed of the turbine of the torque converter;
an engine monitoring module configured to determine an engine acceleration, the continuous shift determination module being configured to estimate a shift time for the continuous upshift of the CVT based on the torque converter turbine speed and the engine acceleration, the lockup clutch engagement module being configured to alter the clutch engagement state at about the shift time of the continuous upshift.

17. The propulsion system of claim 16, wherein the lockup clutch engagement module is configured to alter the clutch engagement state by one of engaging and disengaging the torque converter lockup clutch.

18. The propulsion system of claim 17, the control system further comprising:
a vehicle dynamics module configured to determine a vehicle speed and a vehicle acceleration; and
a ratio map module configured to determine a pulley ratio map based on the vehicle speed and the vehicle acceleration, the continuous shift determination module being configured to determine that the continuous upshift is impending based at least in part on the pulley ratio map.

19. The propulsion system of claim 18, the torque converter monitoring module being configured to determine a current turbine acceleration and determine a projected turbine acceleration based on a current pulley ratio, a projected ratio of the pulley ratio map, and the current turbine acceleration, the continuous shift determination module being configured to start a timer if it is determined that a continuous upshift is impending.

20. The propulsion system of claim 19, the torque converter monitoring module being configured to capture an initial torque converter slip, the torque converter monitoring module being configured to determine a torque converter lockup clutch slip profile based on the projected turbine acceleration and the initial torque converter slip, the control system being configured to determine timing of an equation of an engine speed with the turbine speed based on the torque converter lockup clutch slip profile.

* * * * *